SUBSCRIBER CARRIER FOR SPECIAL SERVICE APPLICATIONS

Filed July 5, 1968 7 Sheets-Sheet 1

INVENTORS
LESTER Q. KRASIN
CLIFFORD E. GREENE
BY Roy B. Moffitt

SUBSCRIBER CARRIER FOR SPECIAL SERVICE APPLICATIONS

Filed July 5, 1968 7 Sheets-Sheet 2

INVENTORS
LESTER Q. KRASIN
CLIFFORD E. GREENE
Roy B. Moore
ATTORNEY

SUBSCRIBER CARRIER FOR SPECIAL SERVICE APPLICATIONS

Filed July 5, 1968 7 Sheets-Sheet 3

INVENTORS
LESTER Q. KRASIN
CLIFFORD E. GREENE
Roy B. Moffitt ATTORNEY

INVENTORS
LESTER Q. KRASIN
CLIFFORD E. GREENE
BY Roy B. Moore
ATTORNEY

INVENTORS
LESTER O. KRASIN
CLIFFORD E. GREENE
Roy B. Morris ATTORNEY

SUBSCRIBER CARRIER FOR SPECIAL SERVICE APPLICATIONS

Filed July 5, 1968 7 Sheets-Sheet 6

INVENTORS
LESTER O. KRASIN
CLIFFORD E. GREENE
Roy B. Moffitt ATTORNEY

SUBSCRIBER CARRIER FOR SPECIAL SERVICE APPLICATIONS

Filed July 5, 1968 7 Sheets-Sheet 7

INVENTORS
LESTER O. KRASIN
CLIFFORD E. GREENE

Roy B. Moffitt
ATTORNEY

United States Patent Office 3,501,591
Patented Mar. 17, 1970

3,501,591
SUBSCRIBER CARRIER FOR SPECIAL SERVICE APPLICATIONS

Lester Q. Krasin, Dallas, and Clifford E. Greene, Fort Worth, Tex., assignors to Superior Continental Corporation, Hickory, N.C., a corporation of Delaware Continuation-in-part of application Ser. No. 660,165, Aug. 2, 1967. This application July 5, 1968, Ser. No. 742,832
Int. Cl. H04b *1/00*
U.S. Cl. 179—2.5 28 Claims

ABSTRACT OF THE DISCLOSURE

The instant disclosure relates to a telephone communication system wherein additional facilities are added to the normal cable transmission pair of lines without affecting the original system. This is provided by adding central office carrier units and subscriber carrier units, the latter powered by electrical sources independent of a central office, both units operable at frequencies different from that of the communication system (physical cable pair). Filter means to separate system signals from those of the additional facilities are also included. In addition, the subscriber carriers are connected to a switching device (switchboard) to provide a special service circuit for private line service, PBX, PAX service, or foreign exchange service. Such is provided in the subscriber carrier unit by a ring control circuit, a ring-trip circuit, a dialing switch, a single relay, an independent source of ringing voltage in combination with transmitter and receiver sections. In order to take care of various types of inward signaling that may be present in key, PAX, switchboard, PBX, or foreign exchange equipment, ringing voltage is simultaneously applied across the drop side (output) leads of the subscriber carrier unit and also from one of these leads to ground so as to operate switchboard signal equipment (bells, lights, gongs and etc.) whether or not such equipment is grounded.

This application is a continuation-in-part of application Ser. No. 660,165, which was filed on Aug. 2, 1967, which in turn is a continuation-in-part of Ser. No. 549,399 (now abandoned), filed on May 11, 1966. This invention relates to telephone communication systems, and more particularly to apparatus for use in combination with existing telephone systems. Such added apparatus—as in the case of the patent applications parent to the instant application—facilitates the addition of a second subscriber telephone circuit to each cable transmission pair, which otherwise only provided a single one-party circuit. But, in the instant invention, a special service circuit for private line service, PBX, PAX, or foreign exchange service is provided by a unique modification of the apparatus disclosed in the aforementioned parent applications.

With the rapid growth in population, a problem arose in telephone communication systems of providing for subscriber circuit expansion in areas where the subscriber exchange plant was already congested, without the necessity of adding cable reinforcement. In other words, the problem was that of furnishing a second listed telephone for business or residence, that would also provide PBX, switchboard, key system, PAX, or foreign exchange service. This problem is especially critical in many so-called "dedicated plant" areas where only one cable pair was allotted per residence or business address. A general object of the present invention is to provide practical, efficient and economical solutions to the aforesaid problem. Another object of our invention is to provide a system that is adapted for use in combination with and is readily applicable to existing telephone facilities and will supply a second subscriber circuit plus a switching means (switchboard) from a single cable pair. Moreover, it is an object of the invention to provide such a system that can be installed and maintained easily by telephone company personnel with no special skills being required.

Another object of the present invention is to provide a system for supplying a second subscriber circuit, requiring no external adjustments when and after it is installed, plus a switching means (switchboard) for an existing cable pair in a conventional telephone system. Equipment of our invention may readily take the form of prepackaged units that can be easily installed at the subscriber and central office station of the system. There is no common equipment associated with this system of our invention, which is required for a plurality of our units. Thus, no economic penalty is involved in applications where only a small number of circuits are required. Consequently, the equipment can be installed on a circuit-per-circuit basis as required, on a readily determined fixed cost-per-circuit basis.

A more specific object of the present invention is to provide a system for deriving a second telephone set connected to a switchboard, which is in turn connected to a subscriber carrier circuit that is connected to the existing cable transmission pair in a telephone system. The subscriber carrier unit (circuit), telephone set, and switching device (switchboard or key system) utilizes two independent sources of power: (1) a power source located in the switching means (switchboard or key system) adapted to power not only the switching means and the subscriber carrier unit, but also to furnish power to signal the central office employing the transmitter section of the subscriber carrier circuit (unit), and (2) an AC power source used to apply ringing voltage in such a manner that various types of inward signaling may be taken care of present in key, PBX, PAX, or switchboard equipment. A power source independent from any of those mentioned above and located in the central office is used to power the central office carrier unit.

The unique structure of the present invention, which facilitates a special service circuit, also greatly enhances the simplicity of the equipment. The only connections required are to the existing line terminals of the central office equipment for a central office carrier unit and to the transmission cable pair at the subscriber station for a subscriber carrier unit and its associated switching means (switchboard). Our invention creates a completely static carrier channel, one which requires only the connection of the affected circuits to make it fully operable. Other objects, advantages and features of the present invention will become apparent from the following detailed description, one embodiment which is presented in conjunction with the drawings, in which:

Figure 1:
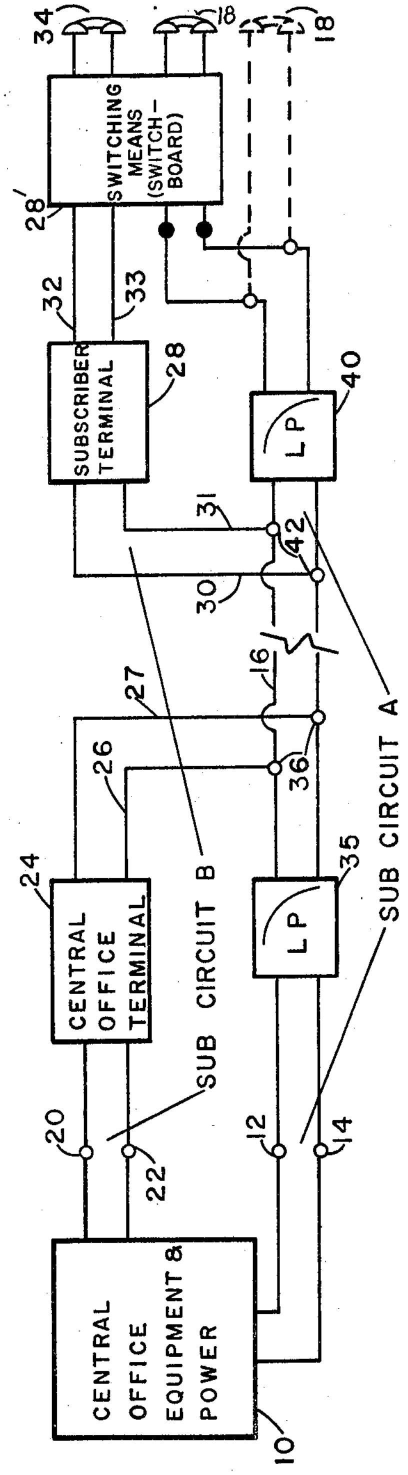
FIGURE 1 is a block diagram showing the broad concept of a system embodying the principles of the present invention.

In the drawing, FIGURE 1 shows diagrammatically the arangement according to the present invention, wherein a carrier derived circuit is connected to a single physical subscriber circuit on a conventional telephone system, thereby enabling at least one additional telephone set to be added to the one normally provided by the single transmission cable pair. Thus, at a residence or business office, which is connected by only one cable pair to the telephone central office, a special service circuit for private line service, PBX, PAX, switchboard, key system or foreign exchange service can be added without increasing the transmission cable facilities. As shown, the conventional telephone exchange central office equipment, including its DC power source, switching relays and line-finding circuits, and etc., is represented by the block 10. Its connector terminals 12 and 14 for the conventional subscriber's circuit, which shall be referred to as circuit A, are connected to a standard cable pair 16. This cable pair extends to the subscriber's station and may be conventionally connected to a telephone set 18 as shown in dotted lines. Another pair of connector terminals 20 and 22 extending from the central office equipment are connected to a central office carrier terminal unit (circuit) 24. This unit (circuit) creates the carrier derived circuit, and is hereafter referred as circuit B. On the other side of the central office carrier unit circuit, a pair of leads 26 and 27 are connected to the cable pair 16.

At the subscriber station, a subscriber carrier unit 28 is connected on one side by a pair of leads 30 and 31 to the cable pair 16, and by another pair of leads 32 and 33 on the other side to a switching means (switchboard) denoted as 28'. A plurality of telephone sets, 34 and 18, may be connected to the switching means. Thus, a telephone set can be connected to the derived carrier circuit by means of the switching device and a telephone set through the same switching means, can be connected to the conventional subscriber circuit, i.e., the circuit formed originally by the physical cable pair. The carrier circuit B, including the central office carrier unit 24 and the subscriber carrier unit 28, provide means for deriving and applying to transmission cable pair a double sideband amplitude modulated voice frequency signal. The system utilizes different frequencies for the two directions of transmission. In the following description, $F_1$ designates the frequency of the signal transmitted from the central office carrier unit 24 to the subscriber station, while $F_2$ designates the frequency transmitted from the subscriber unit 28 to the central office station.

At the central office, between the equipment terminals 12 and 14 and the junctions 36 of the central office carrier leads 26 and 27 with the cable pair 16, any non-carrier signal transmitted towards the central office passes through a first voice frequency (VF) low pass filter 35. Similarly, at the subscriber station a second voice frequency low pass filter 40 is connected to the cable pair between the switchboard (switching means) and the junctions 42 of the cable pair 16 and the input leads 30 and 31 of the subscriber carrier unit 28. These filters 35 and 40 provide a means for isolating the physically derived circuit (circuit A) from the carrier circuitry associated with the carrier derived circuit (circuit B). Thus, since the added carrier circuit operates at the relatively low carrier frequencies $F_1$ and $F_2$, its transmissions are filtered out of the cable pair 16 portion between the filters 40 and 35 and switching means 28' and central office 10 respectively, and are thereby prevented from reaching the conventional telephone receiving equipment at either the central office or subscriber station.

Figure 2:
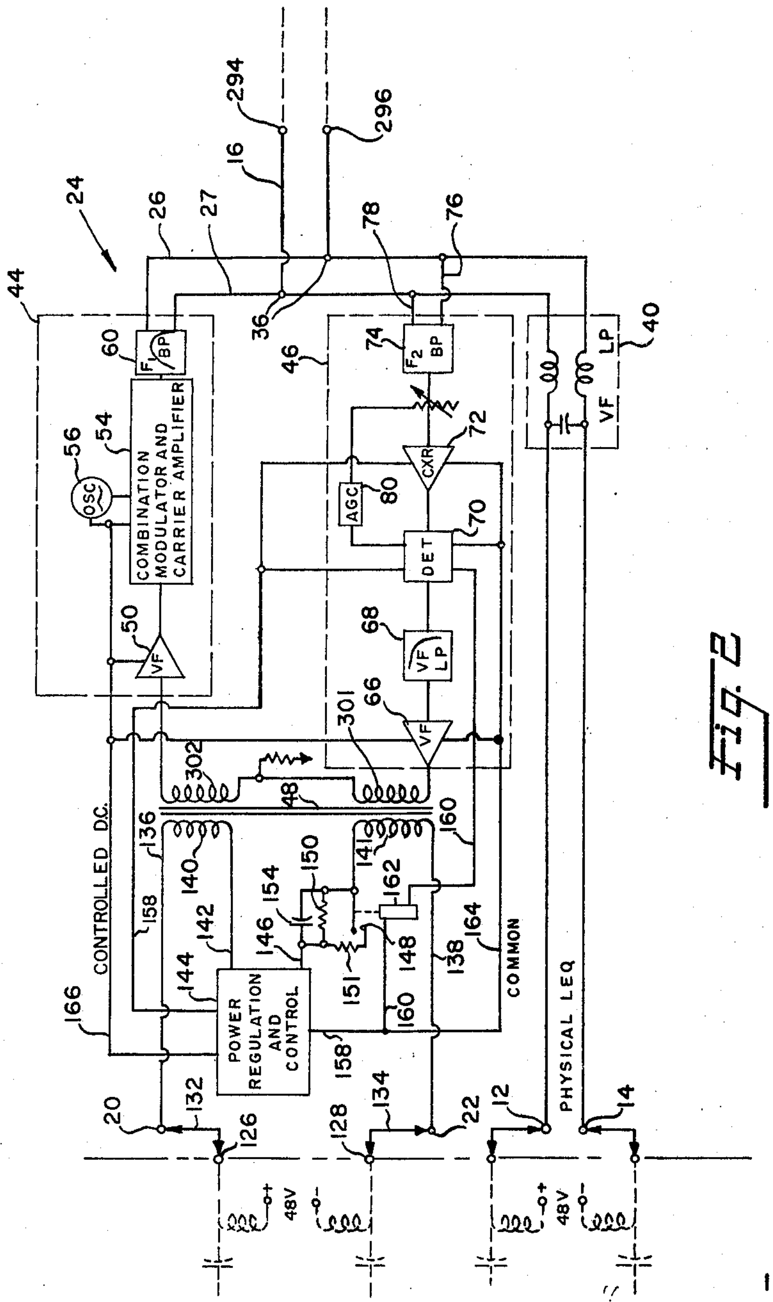
FIGURE 2 is a combined block and circuit diagram showing one embodiment of a central office carrier unit for the system of FIGURE 1.

As shown n FIGURE 2, one embodiment of a central office terminal unit 24 comprises transmitter and receiver sections 44 and 46 respectively, both of which are connected to a hybrid transformer 48. The transmitter section includes a voice frequency (VF) amplifier 50 connected in series to a combination amplifier-modulator 54 connected to an oscillator 56 operating at the frequency $F_1$, a band-pass filter 60, the latter having output leads 26 and 27 connected to the cable transmission pair 16. The receiver section 46 of the central office carrier unit includes a voice frequency (VF) amplifier 66 connected in series to a voice frequency (VF) low pass filter 68, a detector 70, a carrier amplifier 72, and a band-pass filter 74 set for the frequency $F_2$ and having a pair of input leads 76 and 78 connected to the leads 26 and 27 and thus, to the cable transmission pair 16. An automatic gain control means 80 is utilized in the central office carrier unit to maintain a substantially constant voice frequency (VF) output with the wide range of signal power input levels, thereby eliminating the need for external field adjustments.

In an actual installation of our system, the central office carrier unit 24 is preferably packaged as a small compact electronic component using conventional assembly techniques. Thus it may be easily attached to the standard iron frame used for conventional telephone equipment, with the terminals for the connections, as described, being readily accessible.

Figure 5:
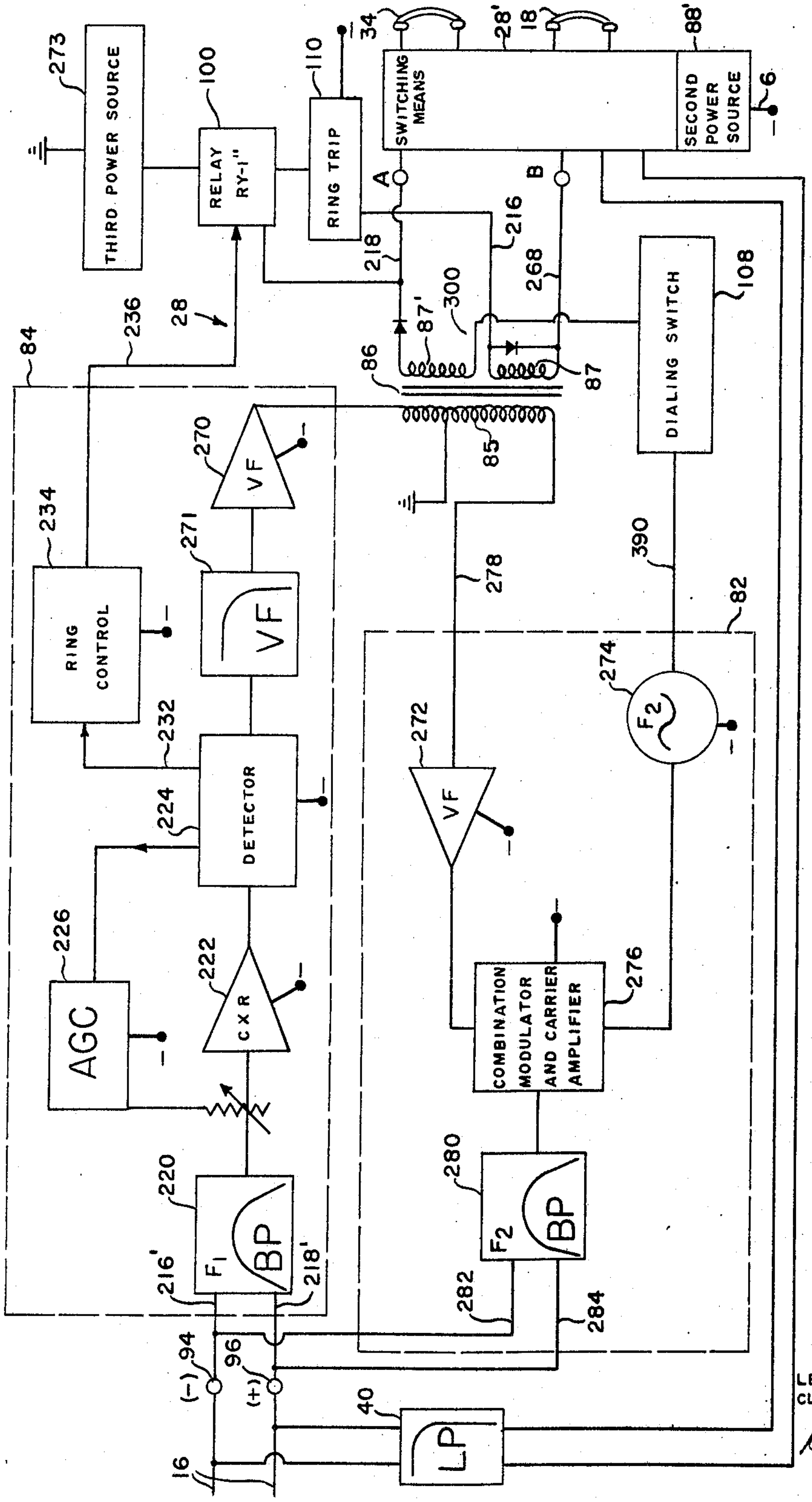
FIGURE 5 is a combined block and circuit diagram showing the subscriber carrier unit (circuit) connected at the subscribing station.

The subscriber carrier unit 28, as shown in detail in FIGURE 5, is generally similar to the central office carrier unit 24 in that it has a transmitter and receiver sections 82 and 84 and equivalent components for filtering, amplifying, detecting and controlling signals, as described below. The transmitter and receiver sections are connected to the cable transmission pair 16 and, through a hybrid transformer 86, on side of which is split, to a switching means (switchboard) 28', which in turn is connected to subscriber telephone sets 18 and 34. One primary difference between the subscriber carrier unit 28 and both embodiments of the central office carrier unit (24 and 24')—FIGURES 2 and 7 respectively—is that the subscriber carrier unit 28 is connected to a second power source that is independent from the first central office power source (terminals 1 and 2 of FIGURE 7 and terminals 126 and 128 of FIGURE 2), along with a third power (AC) source 273 that forms a part of the subscriber carrier unit 28. This third subscriber unit power source is one that provides ringing voltage and AC current. In addition, the subscriber carrier unit 28 contains a relay (100 or RY–1''), in this instance a single relay, a ring-trip circuit 110 and a dialing switch circuit 108. In accordance with the principles of the invention, the subscriber terminal unit 28 is powered by a second source of DC power located in the switching means 28'. This second power source 88' of DC powers the switching means 28' and the subscriber carrier unit 28. It should be noted, however, that DC power source 88' powers a transmitter 82 that signals the central office at a frequency different from that frequency of the third power source 273. Furthermore, the transmitter section 82 of the subscriber carrier unit 28 contains a voice frequency (VF) amplifier 272 connected in series to a combination modulator carrier amplifier 276. The modulator carrier amplifier combination 276 is in turn connected to an oscillator 274 and band-pass filter 280. This band-pass filter, tuned to $F_2$, has output leads 282 and 284 connected to the cable transmission pair 16.

The function of the receiver section 84 of subscriber carrier circuit 28 is as follows: After a signal of a given value passes through the band-pass filter 220, which is tuned to $F_1$, this signal value is desired to be of a predetermined level so that it can be amplified by amplifier 222 by a constant magnitude in a linear fashion and detected by detector 224. When the signal value appearing just out by filter 220 is less than a given predetermined value, then more of said signal passes through a "variable resistor" which is actually the automatic gain control circuit. The signal passing through the "variable resistor" (AGC) is amplified linearly, i.e. by a given or constant magnitude, by amplifier 222 to the value (predetermined) originally and previously determined as that value the detector would optimumly operate.

On the other hand, if the signal appearing just out by band-pass filter 220 is greater than that of a prerdetermined level, after amplification by amplifier 222 for which the detector is set, then there is more resistance by the "variable resistor," i.e. automatic gain control 226, appearing between band-pass filter 220 and carrier amplifier 222. Consequently, less signal is passed by said variable resistance, and less signal is amplified by carrier amplifier 222 in a linear fashion by a constant magnitude. This then explains the function of the automatic gain control as it functions in combination with the detector 224 and carrier amplifier 222. Obviously, all such combinations of such components—carrier amplifier, automatic gain control and detector—as shown in the receiver sections of the central office carrier circuits, also shown in FIGURES 7 and 2, operate in the same manner.

The subscriber carrier unit 28 differs further from the central office carrier unit 24 in that the switching member or output side of the hybrid transformer 86 is split into coils 87 and 87' creating four leads 218, 216, 268 and 300. Lead 218 is connected to the switching means 28' and lead 300 is connected to a dialing switch 108. Lead 216 is connected to a ring trip circuit 110 and lead 268 is connected to the switchboard or switching means 28'. In the receiver section of the subscriber unit 28, the ring control circuit 234 is connected to a single relay RY–1" designated as 100, which in turn is connected to a third alternating voltage source 273. It is this source that furnishes ringing voltage to the switchboard or switching means. The relay 100 is connected not only to the third power source 273 but, as previously mentioned, to the ring-trip control 110. A dialing switch 108, which is connected to lead 300 of coil 87' is connected to oscillator 274, which in turn is connected to combination modulator and carrier amplifier 276.

The single relay 100 when energized, is used in the subscriber carrier unit 28 to allow passage of ringing voltage from local ringing source 273 to the subscriber carrier output leads 218 and 268, which are connected to the switching means 28'. This is the drop or output side of the carrier unit. The ringing voltage is converted to unipolar pulses by a diode CR–2—FIGURE 6—and a capacitor C–9, which will be described later, and these unipolar pulses are blocked from the carrier unit 28 by a diode CR–3 (FIGURE 6), as will be amplified in further discussion. Thus, it will be seen that ringing voltage is applied both metallically across the leads 218 and 268 and also from lead 218 to ground to achieve a negative potential. Such an arrangement will take care of various types of signaling that may be present in switchboard, key and/or PAX equipment. For example, switching equipment that has electromechanical or non-electromechanical switching means can be operated from this type of equipment the phraseology ringing voltage applied metallically means that a voltage is applied across conductors themselves and through the metal in the conductors carrying the current. A metallic circuit is one that is bridged, i.e., a ground is not used to complete the circuit. Thus a metallic circuit is in contradistinction to a divided circuit, i.e., one that does use a ground connection for a circuit completion. See the discussion of metallic circuits and definition thereof, Class 179, Sub-Class 4.

Figure 6:
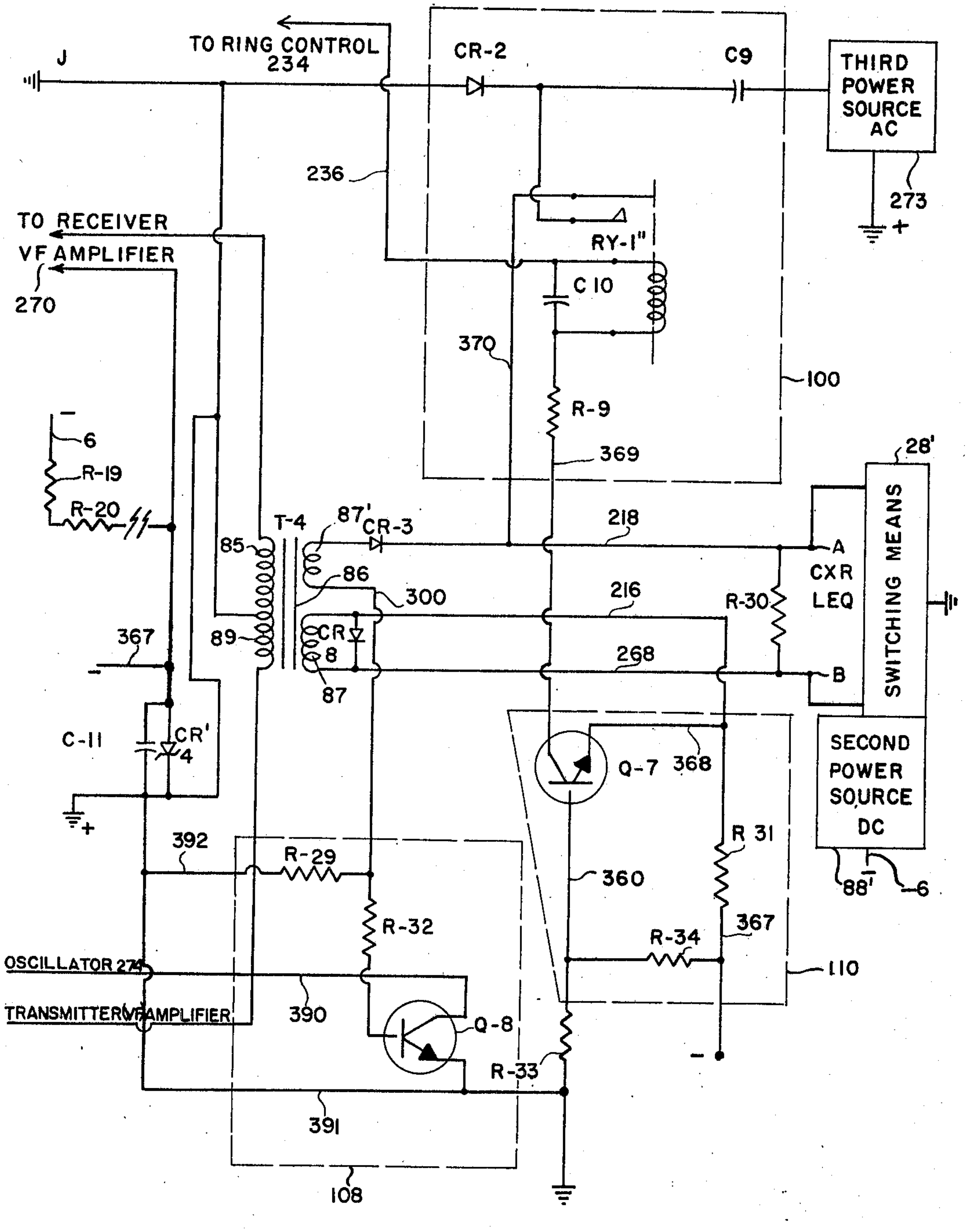
FIGURE 6 is a detailed circuit diagram showing a portion of a subscriber carrier circuit that includes a second and third power source, relay circuit, ring-trip switch, dialing switch, and a switching means connected to an impedance means (hybrid transformer) of the subscriber carrier unit shown in FIGURE 5.

For outward dialing, a transistor switch 108—FIGURES 5 and 6—is used. Completion of a metallic circuit across leads 218 and 268—brought about by an "off hook" condition at switching means 28'—causes the switch 108 to allow operating current to be applied to oscillator 274 thus creating a signal generated by oscillator 274. This signal is passed to modulator carrier amplifier combination 276 thereby causing carrier current to be transmitted toward central office terminal 24 or 24'. The subscriber carrier unit 28 also contains, as previously mentioned, a ring-trip circuit 110. Completition of metallic circuit ("off-hook") condition across leads 218 and 268 of FIGURE 5 or terminals A and B of FIGURE 6 causes the dialing switch to release, thereby opening the circuit to the coil or relay 100 or RY–1" and thus preventing the application of ringing current to the carrier drop.

The aforesaid and other features of the invention will now be described in greater detail by reviewing the various modes of operation of a typical system incorporating the invention.

DETAIL OPERATION OF SPECIAL SERVICE LINE

Figure 7:
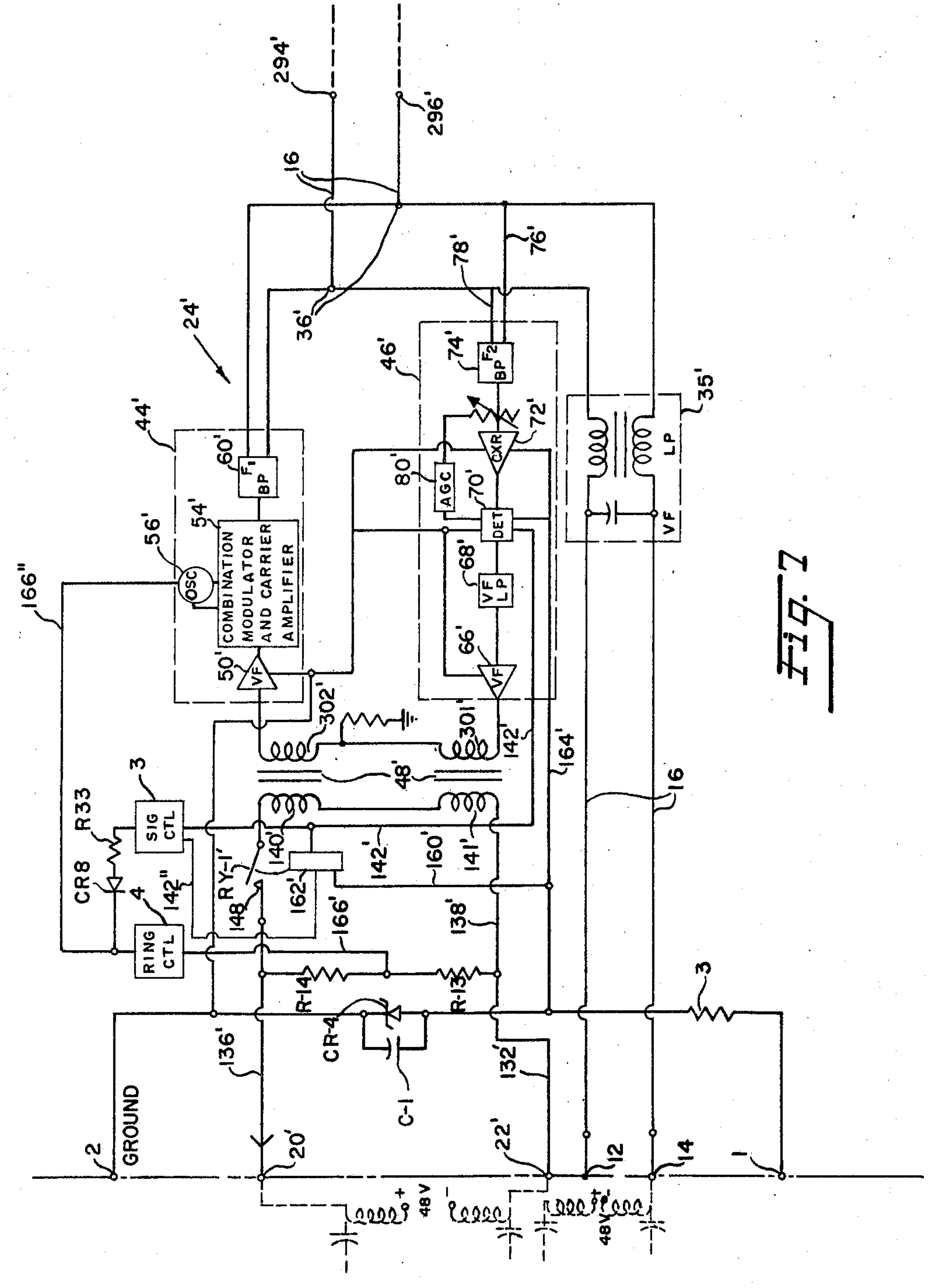
FIGURE 7 is an alternate embodiment of a central office carrier unit.

Two alternate circuits may be used for the central office carrier unit. The first of these circuits 24 is shown in FIGURE 2 and the second 24' is shown in FIGURE 7. The embodiment 24' of FIGURE 7 is powered by a separate 48-volt central office battery feed. This battery feed is connected to terminals 1 and 2 whereas the usual central office power is connected to terminals 126 and 127 as shown in FIGURE 2. The voltage supplied by the independent 48-volt source, that is, the power supplied to terminals 2 and 1, is supplied through a dropping resistor 3 to power and regulation control circuit shown as Zener diode CR–4 and capacitor C–1.

The central office carrier unit as shown in FIGURE 2 is similar in design to that as shown in FIGURE 7 except that it is powered from the 48-volt battery supplied by the line equipment connected to the carrier derived voice drop. The central office carrier unit 24 is completely powered by normal talking battery current, which is supplied through a line relay circuit (not known) in the central office equipment 10 of FIGURE 1 to a pair of line terminals 126 and 128. In the "idle circuit" condition, voltage of the polarity shown in FIGURE 2, which is applied to these terminals, is supplied through leads 132 and 134 to the terminals 20 and 22 of the central office carrier unit 24. This voltage through the lead 136 and winding 140 of the hybrid transformer 48 is applied through a lead 142 to a power regulation and control circuit 144. It returns through lead 146 and a network consisting of a dialing relay contact 148, and a pair of resistors 151 and 150. Resistor 151 and capacitor 154 are used as an arc suppression circuit. This circuit is connected to the relay contact 148 in series with resistor 150.

Voltages derived from this circuit, as well as the voltages derived from the power regulation and control circuit are used to:

(a) Power the circuit of the receiver 46 in an "on-look" condition, and (b) Turn on the transmitter 44 when a carrier frequency signal is received from the subscriber carrier unit, (c) Turn on the transmitter 44 when ringing voltage is applied to the drop side, i.e. the central office side of the carrier derived circuit (circuit B) and the switchboard 28' is in an "on-look" condition.

The aforesaid functions are accomplished through a series of output leads that extend from the power regulation and control unit 144. A first such lead 158 extends to the detector 70 and the carrier amplifier 72 of the receiver unit 46 and also by a branch lead 160 through a relay coil 162 to the detector, providing current to the receiver. A second output lead 164 is the common return lead for all electronic circuits. A third output lead 166 provides control DC power to the voice frequency (VF) amplifiers 50 and 66 of both the receiver and transmitter sections respectively and to the modulator and carrier amplifier 54 combination of the transmitter sections 44.

Figure 3:
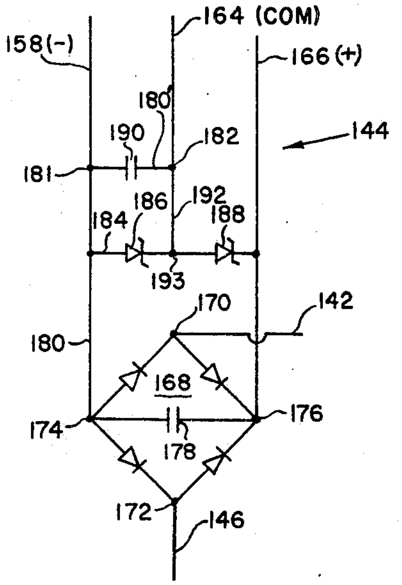
FIGURE 3 is a detailed circuit diagram showing a series mode of power regulating system for the central office terminal unit of FIGURE 2.

The power regulation and control circuit 144 may be arranged for either series or parallel mode operation. In the series mode, shown in detail in FIGURE 3, the control circuit includes a bridge rectifier 168 having four terminals 170, 172, 174, and 176. The input lead 142 is connected to the terminal 170 and the opposite terminal 172 is connected to the lead 146 of a dialing relay network. The terminal 174 is connected to the first and second output leads, 158 and common 164, by lead 180 at junctions 181 and 182, respectively, and the opposite terminal 176 is connected directly to the third output lead 166.

In the "idle circuit" condition, the DC voltage through the input lead 142 by way of coil 140 to the bridge rectifier 168 causes this voltage to appear across a capacitor 178 in a conductor connected between the opposite terminals 174 and 176. From the terminal 181 the lead 180 extends through capacitor 190 to a junction 182 with lead 164, which is at a common potential level. Between the lead 180 and the output lead 166 is a lead 184, in which two Zener diodes 186 and 188 are connected in series. In an extension of the lead 180 connected to the common junction 182 and in parallel with the first Zener diode 186, is a capacitor 190. The lead 192 connects junction 193 at the common junction 182, junction 193 being a point between the two Zener diodes 186 and 188. Diode 186 obviously is a lower voltage Zener than Zener 188. Voltage drop caused by the functional load and resistor 150 on lead 146 is enough to keep the voltage to a level so as to not allow Zener 188 to reach its Zener voltage, at the same time Zener 186 has reached its Zener voltage. Thus all central office carrier receiver priorities is supplied on leads 155 and 164. When an incoming signal is detected, resistor 150 is shorted out; therefore, voltage across junctions 176 and 174 is increased, which in turn allows Zener 188 to reach its Zener voltage and supply power across leads 164 and 168.

The DC voltage appearing across the capacitor 178 in the "idle circuit" condition causes a voltage to appear across the first Zener diode 186 and the capacitor 190. This voltage is also present in the first output lead 158 and maintains the carrier amplifier 72, the detector 70 and the automatic gain circuit 80 in an active circuit condition. Thus, as is stated in a number of places through the instant specification, it can be seen that the receiver section of the central office carrier unit is always in an energized condition. The rest of the electronic circuitry of the central office terminal 24, being supplied with power through the lead 166 from the opposite terminal 176, is of such a magnitude as not to allow the second Zener diode 188 to reach its Zener voltage. This is due to the current limiting action of the resistor 150. It is seen therefore that in the "idle condition" the receiver of the central office terminal 24 is at all times in the condition to receive a transmitted signal of frequency $F_2$.

The application of a ringing signal in the central office switching equipment 10 will cause an alternating voltage to be superimposed onto the DC voltage apparent at the tip and ring terminals 128 and 126. This alternating voltage acting through the hybrid terminal windings 140 and 141, as previously described, will be rectified by the bridge circuit 168. The return circuit is through the capacitor 154, which is of such a value as to effectively shunt the current limiting resistor 150, thereby causing an increase voltage to appear across the rectifier capacitor 178. This latter voltage reaches a magnitude that causes the Zener diode 188, which is shunted by the electronic load, to reach its clamping voltage. This increase in voltage in turn will activate, through the output lead 166, the voice frequency (VF) amplifier 50, the combination modulator and carrier amplifier 54, and the oscillator 56, of the central office transmitter 44 thereby causing a signal at frequency $F_1$ to be transmitted through the band-pass filter 60 over the leads 26 and 27 to the terminals 36 placing the signal on the cable transmission pair 16.

Figure 4:
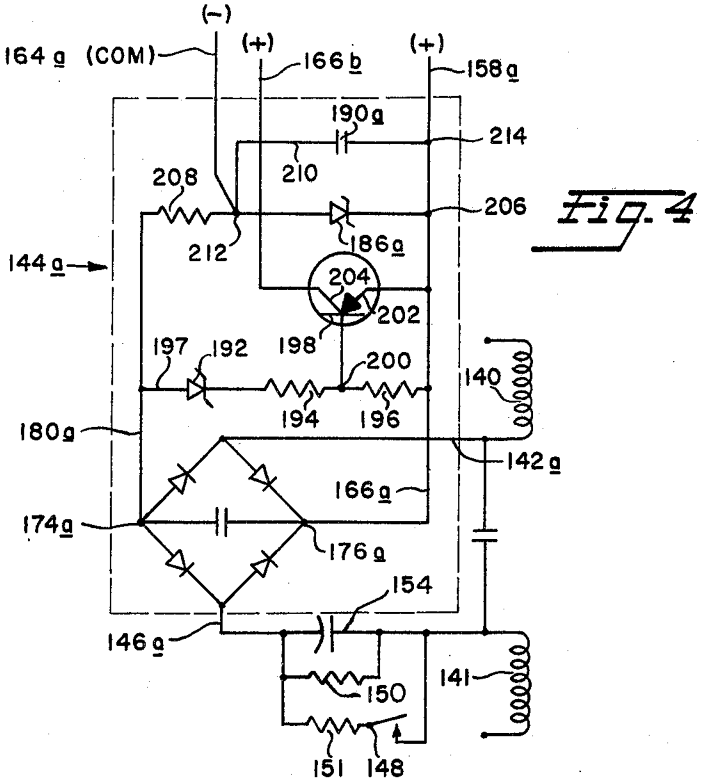
FIGURE 4 is a detailed circuit diagram showing an alternate parallel mode of a power regulating system for the central office terminal of FIGURE 2.

In the parallel operation mode for the power regulation and control circuit **144*a* shown in FIGURE 4, the second Zener diode 188 of the previous embodiment is replaced by a network, which is connected in parallel with the first Zener diode 186*a* and the capacitor 190*a*. The network here comprises another Zener diode 192 and a pair of resistors 194 and 196. In series therewith is a lead 197 extending between a pair of leads 180*a* and 166*a* from the rectifier terminals 174*a* and 176*a*, respectively, the latter being a positive voltage (e.g. 8 volts) and the former being at a common potential. A transistor 198 is base connected to junction 200 between the resistances 194 and 196, its emitter 202 being connected to the output lead 166*a*, and its collector 204 being connected to an output lead 166*b*. In the lead 180*a*, which is connected to a junction 206 with the output lead 166*a* and in parallel with the lead 197, is a resistor 208 and the Zener diode 186*a* in series. In parallel with the Zener diode 186 is a lead 210 connected between junctions 212 and 214 containing the capacitor 190*a*. In the initial "idle" condition with the resistance 150 in the circuit there is not enough voltage difference developed between the output plus lead 166*a* and the common lead 180*a*, to cause current to flow through the Zener diode 192. When the relay contacts 148 are closed and the resistance 150 is shunted, the potential difference between the leads 180*a* and 166*a* is sufficient to cause the Zener diode 192 to draw current through the resistors 194 and 196. This establishes a turn-on bias between the base and the emitter of the transistor 198, i.e. because current is flowing in lead 197 through Zener 192 and resistors 194 and 196, thus supplying voltage through the output lead 166*b* to the various components of the central office carrier unit 24. The major difference between the foregoing series and parallel modes of operation for the power regulation and control circuit 144 is that in the series arrangement shown in FIGURE 3, the voltage on the output lead 166 is positive in respect to common, and the voltage on the output lead 158 is negative with respect to common. In the parallel mode, the voltage on both the output leads 166*b* and 158*a*** is positive with respect to common. The parallel mode therefore has the advantage of being able to utilize components of the same polarity.

When a signal transmitted from the central office carrier unit 24 or 24′ appears at the terminals 94 and 96 of the subscriber terminal unit 28, FIGURE 5, it travels through a pair of leads 216′ and 218′ and is selectively passed by a band-pass filter 220 tuned to frequency $F_1$ of its receiver section 84. A carrier frequency amplifier 222 connected to the latter filter, a detector 224 and an automatic gain circuit 226 of this subscriber receiver unit section 84 are continuously powered by a voltage from that power source 88′ located in the switchboard or switching means 28′ through lead 6, which is common as shown. Therefore, these aforementioned receiver components are always in a condition to react to any signal selected by the band-pass filter 220. Upon reception of this incoming signal, it is amplified by the carrier frequency amplifier 222 and is detected by the detector 224. The automatic gain control (AGC) circuit 226 acts through its associated components to maintain the output of the detector at a predetermined level. The detector through a lead 232 actuates a ring-control circuit 234—see FIGURE 8—which through a lead 236 allows a DC voltage to be applied to relay 100, also designated RY–1″ in FIGURE 6.

Figures 8, 9:
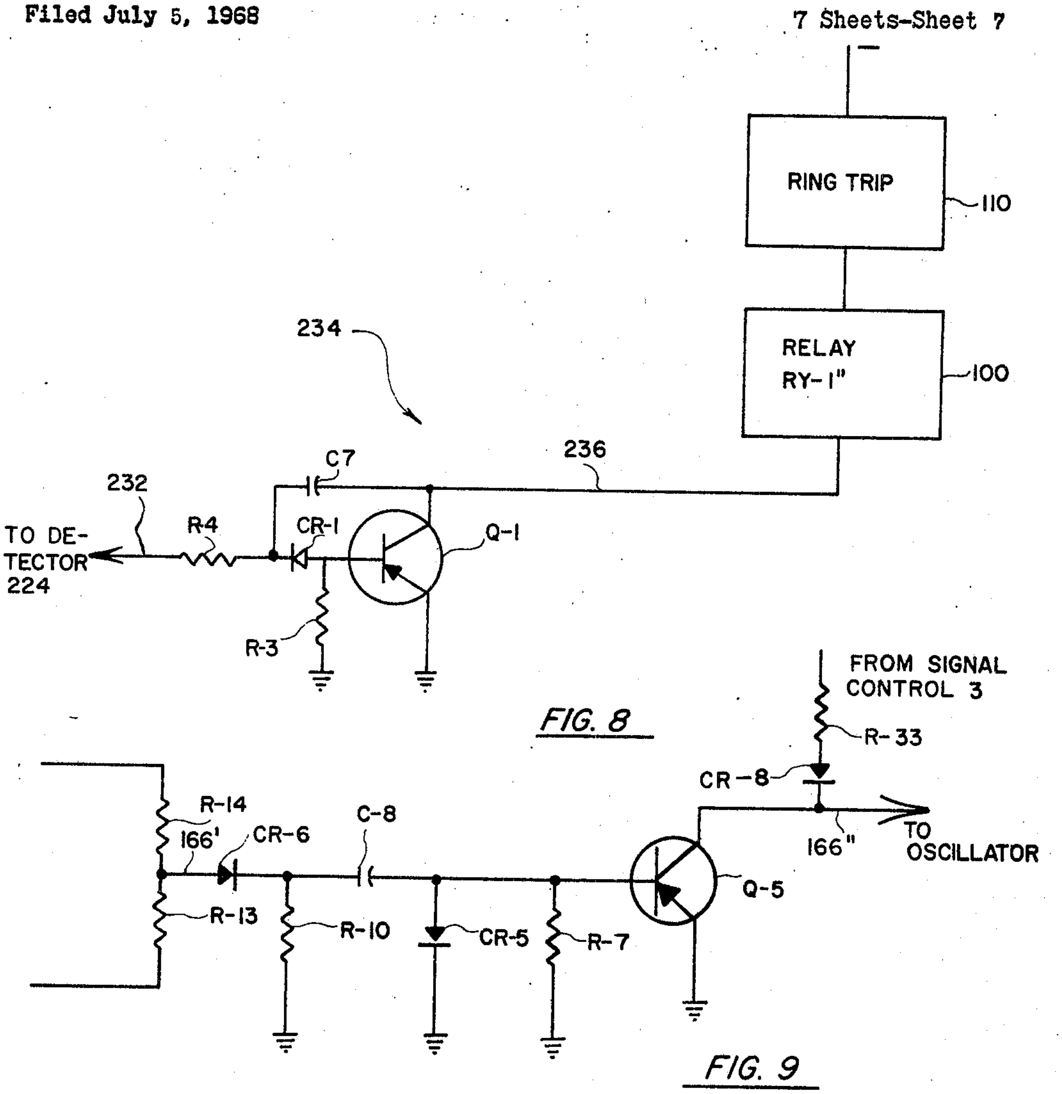
FIGURE 8 is a detail schematic of a central office carrier unit ring control circuit of FIGURE 7.
FIGURE 9 is a detail schematic of a subscriber carrier unit ring control circuit of FIGURE 5 which supplements the detail shown in FIGURE 6.

The ring control circuit 234, as shown in FIGURE 8, has as its main component transistor Q–1, which is a PNP transistor. The base of transistor Q–1 is connected to lead 232, which in turn is connected to detector 224. The emitter is connected to ground. The collector of transistor Q–1 is connected to lead 236 and through this lead to relay RY–1″ or 100. This relay is in turn connected to the ring-trip control circuit 110 of FIGURE 6, which contains in association with transistor Q–7, which is a NPN transistor, resistors R–31 and R–34. Capacitor C–7, as shown in FIGURE 8, is an "anti-chatter" means to keep the contacts of relay RY–1″ 100 from opening and closing in a pulsating manner.

For purposes of description, the "normal" condition of transistor Q–7 of the ring-trip circuit 110—see FIGURE 6—will be characterized as it would be when the carrier circuit is in an "on-hook" condition. In this condition, the base-emitter junction is forward biased, thus rendering transistor Q–7 in a "saturated state." What is meant by forward bias is that current is flowing through lead 360 through the emitter of transistor Q–7, through lead 368, through resistor R–31 and lead 367 to common, which is negative. Stated in another way, the lead 360, just out by the transistor Q–7, is positive in respect to lead 368, which is just out by the emitter of transistor Q–7. In a normal "on-hook" no signal coming in condition, transistor Q–1 of the ring control circuit 234 is reversed biased. What is meant by reversed bias is that a lead connected to the emitter is more positive than a lead connected to the base of transistor Q–1. Resistor R–3 is a biasing resistor for transistor Q–1. The lead 232 obviously is connected to the detector 224. The presence of an AC signal from the detector on lead 232 is rectified by diode CR–1 and thereby forward biases the transistor Q–1, emitter-base junction placing this stage in full saturation. This allows current to flow through transistor Q–1, not through the collector onto lead 236, and through the coils of relay 100 also designated as RY–1″. This energizes the coils of the relay causing the contacts thereof to close. The current flowing through lead 236, coil of relay 100, is blocked by capacitor C–10 but then flows through resistor R–9 (see FIGURE 6) through lead 369 down through and into transistor Q–7, out transistor Q–7 on its emitter side through lead 368 down through resistor R–31, which is on lead 367, back to negative common as shown. Capacitor C–10 also provides for more positive action of relay 100 or RY-1″, i.e. it is an anti-chatter means for the contacts of relay 100.

In a preferred embodiment, a detailed portion of which is shown in FIGURE 6, only one relay RY–1″ or 100 is used in the subscriber carrier unit, and that relay, once energized, is used to switch ringing voltage from a local ringing source 273 through the capacitor C–9, and then to the carrier line equipment drop identified as CXR–LEQ. The ringing voltage is converted to unipolar pulses by capacitor C–9 and diode CR–2. These unipolar pulses are blocked by diode CR–3 from the carrier equipment. The pulses travel through the contacts of RY–1″ 100, through lead 370 and through lead 218 to the switching means (switchboard) 28′. As a return path, the pulses (unipolar) travel down lead 268, through coil 87, out through lead 216, through resistor R–31 and lead 367. This lead 367 connects to Zener diode CR–4′ capacitor C–11 and then to ground, which is positive (+). Thus, ringing voltage is applied simultaneously both metallically across terminals A and B and also from terminal A to ground. This characteristic of the carrier circuit 28 will take care of various types of inward signaling that may be present in key equipment or PAX equipment, i.e. any type of switchboard apparatus irrespective of its internal signaling requirements can be operated by the carrier circuit.

It is quite important to realize that in the transmitter section of the central office carrier units shown in either FIGURE 7 and/or in FIGURE 2 that a voice frequency low pass filter can be interposed between the modulator 54 or 54′ and voice frequency (VF) amplifier 50 and 50′. The same holds true for the transmitter section 82 of the subscriber carrier unit as shown in FIGURE 5. That is, a voice frequency low pass filter may be interposed between the voice frequency amplifier 272 and the combination modulator and carrier amplifier 276. Although these aforementioned filters are not obligatory, such will improve the quality of the circuit operation.

In the central office carrier unit embodiment shown in FIGURE 7, as previously mentioned, the central office carrier unit 24′ is powered by a separate 48-volt central office negative supply, which is connected to terminal 1. Ground or earth potential is terminal 2. The voltage through the lead connecting voltage dropping resistor 3 connects to the Zener diode CR–4, which regulates the voltage (approximately 9 volts). This regulated voltage is used to (1) power the circuitry in the receive section of the central office terminal carrying an on-hook condition; (2) turn on the transmit section when a carrier frequency signal is received from the subscriber terminal; and, (3) turn on the transmit section when ringing voltage is applied to the drop side 20′ and 22′ of the carrier derived circuit when no carrier frequency signal is being received from the subscriber carrier unit 24. All electronic circuits in the central office terminal, in both the transmit and receive sections, derive their operational power from this Zener diode. Accordingly, all circuits have a common return path to terminal 2, which is ground or earth.

The application of a ringing signal in the central office switching equipment (not shown) will cause a low frequency alternating voltage to be superimposed upon a DC voltage, which is always apparent across terminals 20 and 22 or 20′ and 22′, designated "tip" and "ring" in telephone terminology. Ringing voltage can only be applied to the central office terminal if the equipment is in an idle condition, that is, the contacts of RY–1′ or 148 are open and there is no DC path from terminal 20 or 20′ to terminal 22 or 22′ through the contacts of RY–1′, the hybrid transformer 48′ back to terminal 22 or 22′. In the idle circuit condition, there is no carrier frequency signal being received from the subscriber carrier unit 28, and there is no carrier frequency signal being transmitted from the central office carrier on it 24 or 24′ to the subscriber terminal 28.

The low frequency alternating ringing voltage is applied across terminals 20′ and 22′,—FIGURE 7—to a voltage dividing network comprising resistors R–13 and R–14. The alternating voltage appearing at the junction of R–13 and R–14 is applied through lead 166′ to a ring-control circuit 4, which in the main is composed of a transistor Q–5 and diode CR–6—see FIGURE 9. The turn-on of transistor Q–5 then causes a positive voltage to be applied to oscillator 56′. In a normal "on-hook" condition of a central office carrier circuit, with no incoming ringing to said unit, transistor Q–5, a PNP transistor, is biased to an "off" condition, i.e. the emitter is more positive than the base. Obviously, the incoming alternating signal on lead 166′ is rectified by diode CR–6 to unipolar pulses. The pulses, even though they are of a singular polarity, pass through capacitor C–8 and into the base of transistor Q–5. As a result of this signal being placed at the base-emitter junction of transistor Q–5, this transistor is "saturated" and is consequently turned on so as to allow current to flow out of transistor Q–5 on the collector side down lead 166″. Obviously diode CR–8 and resistor R–33—see also FIGURE 7 as well as FIGURE 9—keep these pulses flowing out of transistor Q–5 on the lead 166′ and away from the signal control circuit 3. Lead 166″ being connected to oscillator 56′ allows this signal to activate the oscillator. Resistor R–10 is a means that acts in concert with diode CR–6 so as to render diode CR–6 receptive to a certain predetermined level of incoming signals. Diode CR–5 is a means used to sharpen the "peaks" of the polar impulses first created by diode CR–6. R–7 is a biasing resistor used in biasing transistor Q–5. The activation of the oscillator, comprising a transistorized circuit (not shown), causes the circuitry to generate a carrier frequency signal of 76 kHz. ($F_1$). This frequency is applied to a carrier frequency amplifier 54′ (shown in FIGURE 7 as a combined modulator and carrier frequency amplifier), which in turn, applies the carrier frequency signal through a band-pass filter 60′ to terminals 36′, also designated as the cable pair 16. This places the 76 kHz. carrier frequency signal on the transmission pair at a time duration approximately equal to the length of time that the ringing frequency is applied to the terminals 20′ and 22′.

The subscriber carrier unit, as shown in FIGURE 5, is powered approximately the same as the central office carrier unit. A negative DC voltage is applied to common 6 of switchboard or switching means 28′ of the station terminal with terminal J (FIGURE 6) being grounded or earth connected. The voltage applied at common 6 is connected to voltage dropping resistors consisting of R–20 and R–19—see FIGURE 6. Resistor R–20 is connected to Zener diode CR–4′, which is used to regulate the voltage. All of the electronic circuitry in the subscriber carrier unit 28, in both the transmit and receive portion, derive their operational power from this regulated supply. Terminal J, (see FIGURE 6) which is connected to ground or earth, acts as a common return lead for all of the electronic circuits.

When the ($F_1$) 76 kHz. signal, which was transmitted from the central office carrier unit 24 or 24′ appears at terminals 94 and 96 of the subscriber carrier unit, it travels through the band-pass filter 220, which is in the receiver portion 84 of the assembly 28. The output of the band-pass filter is connected to the carrier frequency amplifier 222, which in turn is coupled to detector 224. An automatic gain control 226 is used to maintain the output of the detector (or demodulator) at a predetermined level. The presence of a signal in the detector causes a voltage to be applied to the ring control circuit 234, i.e. in FIGURE 8 the base of Q–1 through lead 232 and diode CR–1. With the ring-control circuit so activated, a current flows through the winding of RY–1″ (FIGURE 6) through transistor Q–7 of the ring-trip switch 110, thus energizing relay RY–1″ as has been previously described. Once the relay RY–1″ is energized, that is, the contacts are closed, a locally supplied ringing voltage from source 273 is applied through capacitor C–9 through the contacts of RY–1″ to the line equipment drop of the station terminal, i.e. terminals A and B. The ringing voltage is converted to unipolar pulses by the combination capacitor C–9 and diode CR–2. These unipolar pulses are in turn blocked by diode CR–3 from being transmitted through the carrier equipment back towards the central office. The return path for the ringing generator 273 is through the other side of the transformer 86, i.e. coil 87, through lead 367 then through Zener CR–4 and capacitor C–11 to ground as described previously. The locally supplied ringing voltage from source 273 is applied from the carrier equipment towards the switchboard or switching means 28′ or PBX equipment, both metallically across terminals A and B (FIGURE 6) and simultaneously from terminal A to a ground reference point. Relay RY–1″ is activated or energized for a time duration approximately equal to the time that the input carrier frequency signal is applied to terminals 94 and 96, which is for a time duration equal to the length of time that the ringing signal was applied to the central office terminals 20 or 20′ and 22 or 22′. This completes the application of the ringing from the central office through the carrier equipment to the key system or PBX equipment.

A ringing frequency applied across terminals A and B (FIGURE 6) from local source 273 can be used in the key system or PBX to activate audible bells, lights, gongs, or any other electrical or mechanical device. These very same bells, lights, gongs and etc. can be operated by, but not necessarily limited to, a ringing signal carried entirely by the physical cable pair from the central office 10 to the switchboard 28′ as well as by a ringing signal emanating from the subscriber carrier circuit 28. Such devices would be a mere matter of arbitrary choice. Upon detection of an incoming call signal by the customer, by the means in which he has selected, a handset, either 34 or 18, is removed from the telephone instrument, which in turn closes switch-hook contacts and provides a metallic loop or DC path, i.e. a short, from terminal A through the handset back to terminal B through the windings 87 and 87′. The completion of this metallic circuit or loop causes transistor Q–7—FIGURE 6 of the ring-trip switch 110—to release, i.e. become non-conductive. Transistor Q–7, along with associated components R–31 and R–34, act as a ring-trip circuitor switch. The opening of this circuit causes relay RY–1″ to deactivate, preventing further application of ringing current to the carrier drop terminals A and B (FIGURE 6).

When the hook switch is closed, i.e. the receiver of a telephone set is rendered from the "on-hook" to the "off-hook" condition, the circuit created is as follows: Starting at ground (+)—shown just below and to the left of capacitor C–11 of FIGURE 6—current flows from ground (+) to lead 392, through this lead and resistor R–29 to lead 300, up this lead through coil 87′ and diode CR–3 onto lead 218, through switchboard or switching means 28′ out onto lead 268, through coil 87 onto lead 216, and then down lead 367 through resistor R–31 to the negative (−) battery terminal as shown. The voltage developed across R–29, by virtue of this current flow in lead 392, places a forward bias on the base emitter junction of transistor Q–8 to turn on (render saturated) this transistor. This action turns on oscillator circuit 274. The normal state of transistor Q–8 is in the "off" or "unsaturated" state. It is this forward biasing of this transistor that changes the condition of transistor Q–8 from an "unsaturated" to a "saturated" (an off to on) condition, thereby allowing a turning on of oscillator 274.

As it will be remembered, transistor Q–7 in its "normal" state is "on," i.e. current flowing from the ring control circuit 234, which is not a pulsating DC but a constant DC, flows down lead 236, through the coils of RY–1″ or 100, down through resistor R–9, through lead 369, into transistor Q–7, out its emitter side on lead 368, down through resistor R–31 on lead 367, and then to battery or (−) as shown.

The current from the ring control 234, as previously stated, flows through R–31. This is a first current and creates here a first voltage drop. When the switch hook (not shown) of telephone set 34 is closed, i.e. the telephone set 34 is placed in an "off hook" condition, an additional or a second current flows through resistor R–31 in lead 367 to battery, which is negative (−). This circuit has been previously traced, and it is this increased current flow (the first plus the second current) that raises the voltage drop across R–31 from what it was while transistor Q–7 was in an "on" or saturated condition. This increase voltage drop reverse biases transistor Q–7, i.e. making the emitter more positive (+) than the base. It is this reverse biasing of this transistor Q–7 that brings about a change. This change is from a saturated to an unsaturated condition, or from an "on" to an "off" state. Turning this transistor Q–7 "off" stops current flow through the windings of coil RY–1″ (100), which open the contacts of this relay, and thus provides an effective ring-trip or cut-off of the third power source 273 when an incoming call is answered by placing handset 34 in an "off hook" position. Obviously, when the coils of relay 100 are not energized, the contacts of this relay are not closed. Hence, pulsating AC voltage cannot be applied to the switchboard or switching means 28′.

Completion of metallic circuit by removing the handset from the telephone also causes transistor Q–8 of dialing switch 108 (FIGURE 6) to turn on or become saturated, thus applying operating current to the transmit oscillator 274 comprising a transistor and associated components (not shown). The oscillation of the circuitry causes a $R_2$ 28 kHz. carrier frequency signal to be applied to the combination carrier amplifier and modulator 276 and then through the band-pass filter 280. This filter than passes the signal to terminals 94 and 96 and on to the transmission pair 16.

Thus, as soon as the handset is removed from the key system or the attendant's set of a PBX, two vital functions are performed by the subscriber carrier unit 28: (1) incoming ringing is completely deactivated by opening or rendering unsaturated Q–7 (FIGURE 6) of the ring-trip switch 110, thus de-energizing relay RY–1''; (2) saturating or turning on transistor Q–8 of the dialing switch 108 causing the activation of the oscillator 274, which in turn transmits a carrier frequency signal back towards the central office denoting an "off-hook" condition at the key system or PBX.

Figure 10:
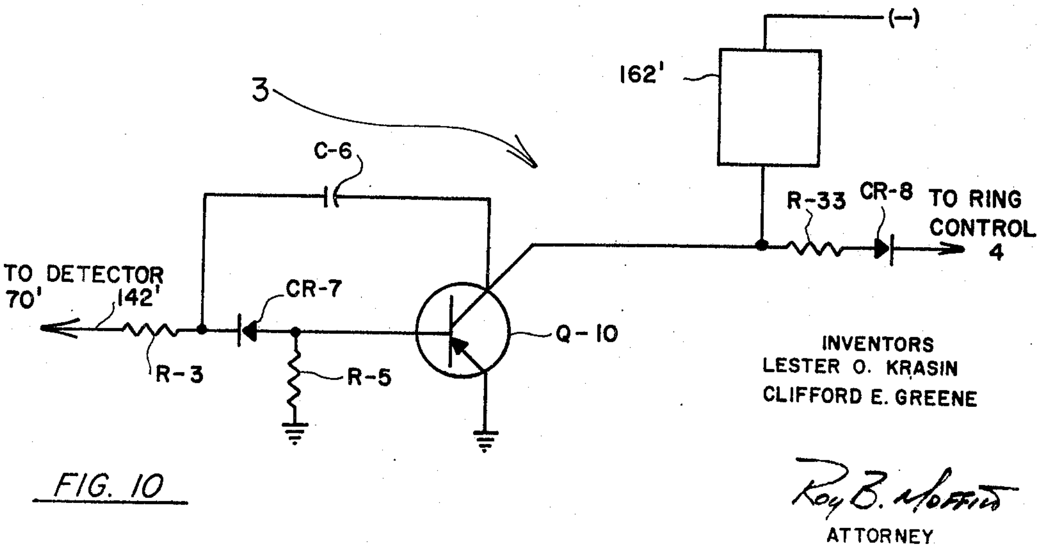
FIGURE 10 is a detail drawing of a central office carrier unit signal control circuit of FIGURE 7.

At the central office carrier unit 24 or 24', the carrier frequency signal transmitted by the subscriber carrier unit 28, when the handset is "off-hook," appears across terminals 294' and 296' or 294 and 296, and is applied through the band-pass filter 74 or 74'. The output of the band-pass filter is applied to the carrier frequency amplifier 72 or 72' through coupling capacitors (not shown). This signal is amplified by the amplifier 72 or 72' and is detected by a transistorized detector 70 or 70' at a predetermined level, which has been established by the automatic gain control 80 or 80'. The presence of the detected signal at the detector 70' allows a turn-on bias to be applied to the base of Q–10 through lead 142'—see FIGURE 10—of the signal control circuit 3. This bias turns on this transistor switch signal control which in turn, allows or causes the operation of the relay RY–1'. The closure of the contacts of RY–1' through the windings of hybrid transformer 48' will present a resistive condition of such magnitude appearing across terminals 22' and 20', as to cause the ringing signal from the central office switching equipment to be cut off or removed.

In the "normal" state, transistor Q–10 is in an "off" condition, which is an "unsaturated" condition. Stated in another way, the base-emitter junction is in a reverse bias state. This reverse bas state does not allow current to flow from the emitter to the collector while the transistor Q–10 is in this condition. Resistor R–5 is a biasing resistor. A signal at the output of the detector stage of detector-modulator 70' flows up lead 142' through resistor R–3 and is then rectified by diode CR–7. This rectification creates unipolar pulses of a singular polarity and appears at the base of transistor Q–10. These pulses then forward bias the base-emitter junction thereby allowing current to flow from the emitter, through the collector down through lead 142'' to a relay coil being shown as 162'. This current energizing the coil and causing the contacts 148 to close, thereby giving an "off-hook" condition to the central office equipment 10 through terminals 20' and 22'. Capacitor C–6 provides feedback so as to allow for a more positive action of transistor Q–10. In addition, current flows through resistors R–33 and diode CR–8, onto lead 166'' to the transmit oscillator 56' to activate this oscillator circuit. This circuit so activated transmits a frequency of $F_1$ through the combination modulator-carrier amplifier 54', through the band-pass filter 60', and then onto the cable pair 16.

At this point, both the subscriber and the central office carrier units 24 and 28 respectively have gone from an idle condition to a completely active condition and are ready to provide two-way voice frequency communication from the key system or PBX equipment 28' to a calling subscriber, i.e. a party other than 18 or 34.

The foregoing discussion completes an incoming call from a calling party to a key system, switchboard (switching means), or PBX 28'. Thus, to complete the disclosure of the instant invention, operation of a Special Service Line System which is in an idle condition, dialing out to a distant subscriber and the activation of the equipment, will be shown. In an idle condition, carrier frequency signals are neither transmitted nor received by the subscriber carrier 28 unit of the Special Service Line equipment. Terminals A and B (FIGURE 6) of the subscriber carrier unit 28 are connected to the line equipment of the PBX or key system switching means 28'. Transistor Q–8—FIGURE 6—plus associated components R–29, R–32, and R–33—the dialing switch 108—are used to detect an off-hook or metallic circuit across terminals A and B as previously described. This operates the carrier frequency oscillator 274 in the transmitter portion 82 of the unit, also as previously described. Furthermore, Q–7 is deactivated by the closure of a hook switch to keep any possibility of incoming ringing to be applied to the switching means before the transmit carrier $F_2$ is received at the central office equipment indicating an off-hook condition to the central office equipment. A subscriber 34 wishing to make an outgoing call from a key system or PBX—switching means 28'—will remove his handset from the telephone instrument, thus closing contacts in the switch hook of the instrument. This creates a metallic condition across terminals A and B (FIGURE 6) and will cause current to flow in the output windings 87 and 87' of the hybrid transformer 86 causing transistor Q–8 of the dialing switch 108 to become saturated as previously described. Thus, operating current is applied to the oscillator 274 to activate same. The activation of the oscillator circuitry causes this circuitry to generate a $F_2$ 28 kHz. signal, which is applied to the combination amplifier-modulator 276 and on through the band-pass filter 280 to terminals 96 and 94 and thus to cable pair 16.

The receipt of the carrier frequency signal across terminals 296 and 294 or 296' and 294' of the central office terminal 24 or 24', applies the signal to the band-pass filter 74 or 74' and on through a pair of coupling capacitors (not shown) and onto carrier frequency amplifier 72 or 72'. The signal is detected by the detector circuitry 70 or 70' and associated circuitry to a predetermined level set by automatic gain control circuitry 80 or 80'. The presence of this detected signal at a transistor (not shown) of the detector 70 or 70' causes a cut-off bias to be applied to transistor Q–10 in the signal control 3—FIGURE 10. The turn-out bias at the base of this transistor Q–10 turns on associated circuitry energizing relay RY–1'—FIGURE 7. The closure of the contacts of RY–1' causes a metallic path to be presented across terminals 20' and 22' through the output windings of hybrid transformer 48'. This resistive or metallic condition is of such magnitude as to cause current to flow through the line circuits or line relay of the central office switching equipment (not shown) energizing such central office relay circuits and consequently applying dial tone to terminals 20' and 22', by means of the central office equipment. This dial tone being a voice frequency tone, is transmitted back by carrier frequency towards the subscriber carrier unit 28 and on to the party 34 who has removed their handset.

Transmission of this dial tone signal from the central office carrier unit 24 or 24' to the station (subscriber) terminal is as follows: The turn-on of the signal control circuit 3 causes operational current to be applied to the transmit oscillator circuitry 56'. This operational current is applied through resistor R–33 and diode CR–8 and causes the oscillator 56' to generate a carrier frequency signal at $F_1$ 76 kHz., which is applied to the combination modulator-carrier amplifier 54'. This signal is in turn applied through the band-pass filter 60' to the transmission cable pair 16.

The dial tone frequency first appearing across terminals 20 and 22, or 20' and 22' from the central office, is applied through the hybrid transformer 48 or 48', to the voice frequency amplifier 50 or 50', modulates signal $F_1$ by means of the combination modulator carrier amplifier 54 or 54', and applied through the band-pass filter 60 or 60' as a carrier frequency to the transmission pair terminals 294 and 296 or 296' and 294'. Thus there is a merger of signal $F_1$ and the dial tone.

At the subscriber carrier unit 28, the $F_1$ 76 kHz. signal modulated by the dial tone frequency, is applied across terminals 94 and 96 to the band-pass filter 220 and on to the carrier frequency amplifier 222 and its associated components. This signal is detected by the detector 224 at a predetermined level, which has been set by the automatic gain control circuitry 226. The detected output at the detector 224 applies a turn-on voltage to the ring control circuit 234, as previously described, but since there is a metallic condition, i.e. a short, across terminals A and B (FIGURE 6) caused by the handset of the party 34 being off-hook, the transistor Q–7 of the ring-trip circuit 110 is turned off (unsaturated) and will not allow the coil of relay RY–1 (FIGURE 6) to energize. The detected output signal in turn is applied to the voice frequency low pass filter 271 (FIGURE 5) through a coupling capacitor (not shown) to the voice frequency amplifier 270. This amplified voice frequency signal is applied to the hybrid transformer 86, which in turn applies this signal across terminals A and B (FIGURE 6) or to leads 268 and 218. Upon receipt of this dial tone, which has been demodulated by detector-demodulator 224, by calling party 34, he will commence dialing. The operation of the dial in the PBX or key system (switching means 28′) will interrupt the DC voltage, which has been applied through the output windings of the hybrid transformer 86 to the instrument. This interruption of the DC voltage will cause transistor Q–8 of dialing switch 108 to be saturated and also turned off (unsaturated) in a sequence that agrees with the digits dialed. For example, a dialed number 8 will interrupt the DC voltage 8 times, which in turn will saturate and cut off (unsaturated) transistor Q–8 8 times. This is no more than creating a plurality of "off-hook"-"on-hook" conditions have been described, no further description is necessary. The cut-off (unsaturated) of transistor Q–8 will remove the operational current from the oscillator 274, thus causing the transmitted $F_2$ 28 kHz. signal to be interrupted at the dialing rate. This interrupted signal is applied across terminals 94 and 96 in the manner which has been described precedingly.

The interrupted carrier frequency signal applied at the terminals 294 and 296 or 294′ and 296′ of the central office terminal will be transmitted through the band-pass filter 74 or 74′ on to the carrier frequency amplifier 72 or 72′ to the demodulator-detector 70 or 70′ and detected at a predetermined level. This detected signal is used to provide a turn-on bias voltage for a transistor Q–10 (FIGURE 10) in the signal control circuit 3, which in turn causes relay RY–1′ (FIGURE 7) to energize and de-energize at the dialing rate. The activation and deactivation of relay RY–1′ contacts will cause the central office switching equipment to step or switch in the well known manner to the desired number, which has been dialed.

Upon completion of dialing a supervisory tone such as busy, all trunks busy or ring-back will be transmitted in the same manner that dial tone was transmitted back to the calling subscriber 34 at the switchboard, PBX or key system. Upon pickup of the handset by the called subscriber (not shown), the switching equipment of the central office will switch the circuit through to the terminals 20′ and 22′ or 20 and 22 of the central office equipment and provide for a connection from the key system or PBX switching means 28′ to the called subscriber. At this point, the Special Service Line equipment is fully active and in readiness to provide two-way voice frequency communication from the called subscriber (not shown) to the calling subscriber 34. Voice frequency tones from the central office equipment applied across terminals 20 and 22 or 20′ and 22′ are connected through hybrid transformer 86 through a coupling capacitor (not shown) to the base of the voice frequency amplifier 50. The signals are in turn modulated and amplified by the combination modulator-amplifier circuitry 54′ consisting of transistors and associated components (not shown). This signal is applied through the band-pass filter 60′ to terminals 294′ and 296′ on to the transmission pair 16 to the subscriber carrier unit 28.

In order to complete the disclosure of the instant invention, talking circuit conditions will be described, employing a central office carrier unit and a subscriber carrier unit, the description concerning the central office carrier unit employing the embodiment as shown in FIGURE 2. However, it is to be understood that the following description, employing the embodiment as shown in FIGURE 2, is equally applicable to the alternative circuit embodiment as shown in FIGURE 7.

Under the talking circuit conditions, conversation appearing at the terminals 126 and 128 passes through the leads 132 and 134, and appearing at terminals 20 and 22 of the terminal equipment are impressed across the windings 140 and 141 of the hybrid transformer 48. This conversation is coupled to a winding 302 of the hybrid transformer, is amplified by voice frequency amplifier 50, and impressed through the modulator portion of the combination modulator carrier amplifier 54, where the conversation effectively modulates the carrier signal $F_1$ developed from the oscillator 56. This modulated signal is then applied to the carrier frequency amplifier portion of the combination modulator-amplifier 54 through the band-pass filter 60, through leads 26 and 27 and to the terminals 36 on the transmission cable pair 16. This signal then appears at the terminals 94 and 96, at the subscriber carrier unit 28 shown in FIGURE 5, and is connected through leads 216′ and 218′ to the band-pass filter 220. It is then amplified by the carrier frequency amplifier, detected by the detector 224, and the automatic gain control (AGC) circuit 226 acts to maintain the demodulated voice frequency (VF) signal at a constant level. This signal is passed through the low pass voice frequency (VF) filter 271 and is amplified by the voice frequency (VF) amplifier 270 before being applied to the secondary winding 85 of the hybrid transformer 86.

The voice frequency information appearing between the terminals A and B is heard through the handset of telephone 34. In the reverse direction, the handset of the subscriber telephone set 34 is effectively in series with primary windings 87 and 87′ of the hybrid transformer 86. Conversation appearing across the terminals A and B is affectively being coupled from windings 87 and 87′ to the secondary winding 85 and to the voice frequency (VF) amplifier 272 of the transmitter 82. From this point forward, the sequence of events is identical with that described in the preivous paragraph.

As stated previously, the function of the circuits as described above is common whether or not the central office circuit embodiment as shown in FIGURE 2 or the central office circuit embodiment as shown in FIGURE 7 is used. Briefly, when the circuit embodiment shown in FIGURE 7 is used, it functions as follows: At the moment subscriber 34 begins to talk, the alternating impulses set up by this voice are transferred in the conventional telephone manner through the hybrid transformer 86. Such alternating impulses are then sent over lead 278 to the amplifier 272, and then to the combination modulator and voice frequency amplifier 276, where amplification and modulation takes place, onto and through band-pass filter 280 and then to the cable pair 16. The signal is received with the central office carrier unit 24′, as shown in FIGURE 7, and passed to the receiver section 46′ in the same manner as set forth in the embodiment using FIGURE 2.

From the foregoing, it should be apparent that the present invention provides an effective solution to the problem of furnishing additional subscriber facilities without increasing cable installations. Furthermore, there is provided a special service circuit for private line service, PBX, PAX, or foreign exchange service. The subscriber carrier unit of the special service circuit achieves its simplicity by unique circuitry that avoids the use and costs of conventional relay circuitry to control ringing, dialing, and supervision.

To those skilled in the art to which this invention relates, many changes in construction and widely differing embodiments and applications of the invention will suggest themselves without departing from the spirit and scope of the invention. The disclosures and descriptions herein are purely illustrative and not intended to be in any sense limiting.

We claim:

1. The system as described in claim 2 wherein said power regulation and control means comprises a bridge rectifier, first and second Zener diodes in a parallel arrangement, said first Zener diode being in series with a pair of resistors, and a transistor switch being base connected between said resistors with its collector providing a power output lead, and its emitter connected to a rectifier output terminal, said first Zener diode being operative to draw current through said resistors to establish a turn-on bias for said transistor when the carrier circuit is activated upon closing of the said receive relay contacts.

2. In a telephone central office carrier unit for providing service to an additional telephone set via a cable pair at a subscriber station without increasing the number of physical cable pairs connected between a central office and a subscriber station, said central office carrier unit including a transmit and receiver section, as well as a power regulating and control means connected to said transmit and receiver sections for regulating voltage received from a central office, said power regulating means including a receive relay and a relay network associated therewith and also including a current limiting resistor connected to said power regulation and control means, said receive relay being operable to close in response to a signal from a subscriber terminal when its telephone is "off-hook" and to short out said limiting resistor thereby causing said central office terminal to draw increased current from a central office source, said power regulation means being responsive to the increase in current to supply controlled DC operating current to carrier receiver and transmitter components, wherein a capacitor is included in said relay network responsive to a ringing voltage applied to the central office carrier circuit when a subscriber telephone set is in the "on-hook" condition, said ringing voltage being applied through said capacitor to shunt said limiting resistor and cause said power regulation means to produce a controlled DC output for turning on the transmitter of the central office carrier unit, and wherein said power regulation means comprises a bridge rectifier, first and second Zener diodes in a controlled network connected to an output from said rectifier and a capacitor connected in parallel to the said first Zener diode and to a rectifier output terminal, said second Zener diode being prevented from reaching its Zener voltage during the idle circuit condition but reaching its clamping voltage in response to a ringing signal to the central office terminal, thereby activating carrier receiver and transmitter components.

3. A telephone subscriber carrier unit adapted to be connected to a subscriber's telephone station and a dual conductor telephone system signal transmission line for providing service to an additional telephone set at said station by transmitting and receiving calls on carrier frequencies concomitantly with calls transmitted at a different frequency level directly between said line and said station, said telephone subscriber carrier unit comprising terminal means adapted to be electrically connected to at least one signaling device which is located in said station for indicating incoming calls, transistor means, biasing means for rendering said transistor means conductive and non-conductive respectively in response to on-hook and off-hook telephone set conditions at said station, means responsive to the transmittal of a predetermined ringing signal along said line for completing a circuit through said transistor means when said transistor means is conductive, and switching means contained in said circuit and being energized by completion of said circuit adapted to apply a ringing voltage to said terminal means to activate said signaling device.

4. The telephone subscriber carrier unit defined in claim 3 wherein the energizing circuit for said switching means comprises a first source of power and wherein a second source of power, which is independent of said first source, is provided for supplying said ringing voltage.

5. The telephone subscriber carrier unit defined in claim 3 wherein said switching means comprises at least one relay device having an operating winding connected in series with a collector-emitter circuit of said transistor means, and wherein said biasing means comprises a resistor in series with said collector-emitter circuit and said winding and connecting said collector-emitter circuit to a source of reference potential, and means for maintaining the voltage drop across said resistor at predetermined value which renders said transistor means conductive in absence of an off-hook telephone set condition at said station and for altering said voltage drop in a direction that reverse biases said transistor means to render said transistor means non-conductive when an off-hook telephone condition occurs at said station for receiving a carrier frequency-transmitted call.

6. In a telephone carrier subscriber unit for providing service to an additional telephone set in a telephone system without increasing the number of dual conductor signal transmission lines connected between the central office and a subscriber's switchboard—which is adapted to control the connection of a plurality of telephone sets to such a signal transmission line and which has at least one indicator operable by a ringing signal generated in response to a predetermined central office signal to indicate an incoming call—comprising receiver and transmit networks connected to a pair of first-signal transmitting terminals and a pair of second-signal transmitting terminals, said first terminals adapted to be connected to the transmission line and said second terminals adapted to be connected to said switchboard, a grounded electrical power source for supplying said ringing signal and normally being electrically disconnected from said second-signal transmitting terminals, means responsive to a ringing signal transmitted along said transmission line to said receiver network for completing a circuit from said source to a means, connected between said receiver and transmit networks, for simultaneously applying said first-mentioned ringing signal across said second signal-transmitting terminals and from one such terminal to ground when said additional telephone set is in an on-hook condition.

7. In a telephone system subscriber carrier circuit which provides in part a second telephone circuit over a physical cable pair, first signal transmission terminals adapted to be connected to a central office by said cable pair and a pair of second signal transmission terminals adapted to be connected to a switchboard, transmitter and receiver networks connected between said first and second signal transmission terminals for transmitting and receiving signals to and from a central office, the receiver network containing means for detecting a central office signal of a predetermined frequency, activating means electrically connected to said central office signal detecting means and being responsive to the detection of said central office signal by said detecting means to connect a grounded source of A.C.-rectified, pulsating voltage to a circuit means, said circuit means being connected to said second terminals and to ground for simultaneously applying said pulsating voltage across said second-signal transmission terminals and from one such terminal to ground.

8. The telephone system subscriber carrier circuit defined in claim 7 wherein said activating means comprises a ring control circuit and a relay, said relay having contact means and a winding which is energizable for actuating said contact means, said ring control circuit being activated by said detecting means upon the detection of said central office signal to complete a circuit for energizing said winding, and said contact means being actuated by energization of said winding to electrically connect said source to said circuit means.

9. The telephone system subscriber carrier circuit defined in claim 8 wherein said switchboard is adapted to transfer signals between a subscriber's telephone set and said second signal-transmission terminals, said telephone system subscriber carrier circuit further comprising a dialing switch means forming a part of said circuit means electrically connected to an oscillator in said transmitter network, said dialing switch means being responsive to a change in state of said telephone set from an on-hook condition to an off-hook condition for interrupting the energizing circuit for said winding and for completing a circuit to turn on said oscillator, said contact means being de-actuated by de-energization of said winding for disconnecting said source from said circuit means, and said oscillator being operative, when turned on, to provide a carrier frequency signal for transmitting the subscriber's signals along said line.

10. A telephone system subscriber carrier circuit as described in claim 7 wherein said transmitter network comprises: a voice frequency amplifier and a combination modulator-carrier amplifier connected in series circuit relationship, a transformer coupling said second signal transmission terminals to said voice frequency amplifier, an oscillator operable at a second predetermined frequency and being connected in series with said combination carrier amplifier-modulator, a band-pass filter connected between the output of said modulator-carrier amplifier and said first signal transmission lines for transmitting carrier modulated signals to said first terminals, said telephone subscriber carrier circuit further comprising dialing switch means connected between said transformer and said oscillator for completing a circuit to activate said oscillator.

11. The telephone system subscriber carrier circuit defined in claim 7 wherein said receiver network further comprises a band pass filter tuned to said first frequency, a carrier amplifier, a voice frequency low-pass filter, and a voice frequency amplifier, and means for transmitting central office signals applied to said first terminals via said line serially through said band pass filter, said carrier amplifier, said central office signal detecting means, said voice frequency low-pass filter, and said voice frequency amplifier to said second terminals.

12. A telephone system subscriber carrier circuit as described in claim 11 including an automatic gain control means in said receiver section for maintaining a constant voice frequency output regardless of variations in signal power input levels.

13. In a telephone carrier subscriber unit for providing service between a central office and an additional telephone set via a dual conductor signal transmission line in a telephone system without increasing the number of dual conductor signal transmission lines connected between the central office and a subscriber's switchboard that is operative to control calls to and from said additional telephone set, said telephone carrier subscriber unit comprising first-signal transmission terminals adapted to be connected to said switchboard, second-signal transmission terminals adapted to be connected to said signal transmission line, receiver and transmitter networks connected to said second terminals circuit means connected to said first terminals and ground and including means for coupling said receiver and transmitter networks to said first terminals, means in said receiver network for detecting an incoming central office signal of predetermined frequency, a grounded power source for supplying a ringing voltage, circuit completing means responsive to the detection of said central office signal for connecting said circuit means to said source to simultaneously apply said ringing voltage across said first terminals and from one such terminal to ground when said additional telephone set is in an on-hook condition, oscillator means forming a part of said transmitter network for providing a carrier frequency for signals to be transmitted from said additional telephone set, and means responsive to a change in the operative state of said additional telephone set from an on-hook condition to an off-hook condition (a) for conditioning said circuit completing means to disconnect said circuit means from said source, thereby ceasing the application of said ringing voltage across said first terminals and from one such terminal to ground and (b) for activating said oscillator means to generate said carrier frequency, said last-named means being further responsive to alternating on-hook and off-hook conditions of said additional telephone set to alternately activate and deactivate said oscillator means for producing dialing pulses, said carrier frequency being different from that of (a) said ringing voltage and (b) said incoming central office signal.

14. A telephone central office carrier unit for providing service to an additional telephone set via a physical cable pair at a subscriber's station without increasing the number of physical cable pairs connected between a central office and said subscriber's station, said telephone central office carrier unit comprising a pair of first signal-transmission terminals adapted to be connected to said cable pair, a second pair of signal-transmission terminals adapted to be connected to a central office circuit for receiving ringing and other voltage signals, transmit and receiver sections connected to said first and second pairs of terminals, circuit means connected through a voltage-terminals for converting central office ringing voltage signals into unipolar pulses, a carrier frequency-producing oscillator means in said transmit section, and means for applying said unipolar pulses to said oscillator means to activate said oscillator means for transmitting carrier frequency signals over said physical pair.

15. A telephone central office carrier unit as described in claim 14 wherein:

(a) said transmit section comprises: a voice frequency amplifier and a combination amplifier and modulator connected in series circuit relationship, said oscillator means being connected to said combination amplifier and modulator for applying said carrier signals to said combination amplifier and modulator at a first predetermined frequency, and a band-pass filter connecting said combination amplifier and modulator to said pair of first terminals; and, wherein said receiver section comprises:

(b) a voice frequency amplifier connected to said second pair of terminals, a voice frequency low-pass filter, a signal detector for detecting signals of a second frequency, a carrier amplifier, and a band-pass filter tuned to said second frequency, and means for transmitting incoming signals applied to said first pair of terminals serially through said band-pass filter, said carrier amplifier, said detector, said low-pass filter and said voice frequency amplifier for application to said second terminals.

16. A telephone central office carrier unit as described in claim 15 including:

(a) an automatic gain control means in said receiver section for maintaining a constant voice frequency output regardless of variations in signal power input levels.

17. In combination with a telephone system including a central office having a first source of power to provide transmission and supervision on a normally-derived subscriber circuit and a pair of conductors connecting said centarl office with a subscriber station having at least a first telephone set operable at a first frequency, a single-party carrier channel apparatus, comprising:

(a) a central office carrier unit for deriving and applying to the conductor pair, a double side-band amplitude modulated signal and having a receiver and a transmit sections with a first pair of leads connected to central office connector terminals and a second pair of leads connected to said conductor pair;

(b) a subscriber carrier unit for deriving and applying an amplitude modulated signal including, receiver and transmit sections connected to said cable conductor pair via a third pair of leads and to a switchboard via a fourth pair of leads, a ring control circuit in said receiver section for activating a relay means, which in turn connects a grounded means for supplying AC voltage to a means for simultaneously applying at least pulses of said AC voltage across the switchboard and from said switchboard to ground when a predetermined carrier signal is received by the subscriber carrier from a central office carrier unit and a telephone set served by said carrier is in the on-hook condition, and means for deactivating the ringing control circuit.

18. The apparatus as described in claim 17 wherein said ringing control circuit is connected to a relay, whose contacts are connected to first and second diodes and a capacitor, whereby upon activation of said ring control circuit by a first current, contacts of said relay close and AC voltage from a grounded power source is converted to unipolar pulses by the first diode and capacitor, blocked by the second diode from the subscriber carrier circuit and applied to the switchboard through the contacts of said relay both metallically across a loop formed between the subscriber unit and a switchboard and from ground to a lead forming a portion of said loop.

19. A system as described in claim 17 wherein:

(a) said receiver section of said central office unit contains a detector connected to a signal control circuit and a relay whereby upon the detector detecting a signal sent from the subscribed carrier unit, said signal control circuit causes curernt to flow therethrough and operate said relay, thereby presenting a cut-off resistive condition to a ringing signal from a central office when the telephone set of a subscriber carrier unit is off-hook, and also causes current to flow through central office relay circuits thus allowing a dial tone to be transmitted back towards said subscriber carrier unit by the transmitter of the central office carrier unit.

20. A system as described in claim 17 wherein:

(a) said central office carrier unit contains a ring control circuit connected to an oscillator and through a voltage-dividing network to leads of the central office equipment, whereby alternating voltage appearing in the voltage-dividing network is applied to said ring control circuit which then causes a voltage of singular polarity to be applied to said oscillator to activate same and subsequently producing a carrier frequency therefrom.

21. In a telephone carrier circuit providing an additional subscriber carrier telephone facility over a dual-conductor signal transmission line which interconnects and conveys calls between a central office and a subscriber's remote telephone station having at least one signaling device for indicating an incoming call, a subscriber's terminal unit connected between said line and said station at the subscriber's end of said line comprising:

(a) means providing a source of rectified AC voltage, (b) a terminal pair adapted to be electrically connected to said signaling device, and (c) means operatively connected between said source and said terminal pair and being responsive to a predetermined ringing signal transmitted along said line from said central office for applying said rectified voltage simultaneously across said terminal pair and from one terminal of said terminal pair to ground to provide current for activating said signaling device regardless of whether it is connected across said terminal pair or from said one terminal to ground.

22. In a telephone subscriber carrier unit having: (a) first and second signal transmission terminal pairs respectively adapted to be connected to a dual conductor signal transmission line and a subscriber's switchboard, which is capable of controlling calls for a plurality of telephone sets and which includes at least one signaling device for indicating an incoming call, and (b) means connected between said first and second terminal pairs of transmitting and receiving calls on carrier frequencies concomitantly with calls transmitted at a different frequency level directly between said line and said switchboard, the improvement comprising subscriber carrier means responsive to the application of a predetermined ringing signal to said first terminal pair for simultaneously applying a rectified AC voltage across said second signal terminal pair and from one terminal of said second pair to ground to provide current for activating said signaling device regardless of whether it is connected across said second terminal pair or from said one terminal of said second pair to ground.

23. The telephone subscriber carrier unit defined in claim 22 wherein said rectified voltage applying means comprises means providing an AC power source and a rectifier means operatively connected between said source and said second terminal pair.

24. In a telephone subscriber carrier unit providing service to an additional telephone set in a telephone system without increasing the number of dual conductor signal transmission lines connected between the central office and a subscriber's switchboard, which contains at least one signaling device for indicating an incoming call and which controls the connection of telephone sets to one such dual conductor signal transmission line, a pair of signal transmission drop terminals adapted to be connected to said switchboard for receiving voice frequency signals to be transmitted via said transmission line to the central office, transmitter means electrically connected between said pair of terminals and said transmission line for modulating a carrier signal with the voice frequency signals applied to said terminal pair of transmittal on said line, receiver means electrically connected between said transmission line and said pair of terminals for (a) demodulating voice frequency modulated carrier signals transmitted via said line from said central office and (b) applying the recovered, carrier transmitted, voice frequency signals to said terminal pair from which they are adapted to be switched by said switchboard to a selected telephone set, and means responsive to the application of a predetermined ringing signal transmitted along said line from said central office for applying a ringing voltage simultaneously across the terminals of said pair and from one predetermined terminal of said pair to ground to provide current for activating said signalling device regardless of whether said signalling device is connected across said terminal pair or from said one terminal to ground.

25. A telephone subscriber carrier unit defined in claim 24 wherein a DC power source is provided for operating said transmitter and receiver means, and wherein said DC source and said ringing voltage source are separate and independent of each other.

26. A telephone subscriber carrier unit adapted to be connected to a subscriber's telephone station and dual conductor telephone system signal transmission line for providing service to an additional telephone set at said station by transmitting or receiving calls on carrier frequencies concomitantly with calls transmitted at a different frequency level directly between said line and said station, said telephone subscriber carrier unit comprising a signal-transmission terminal pair adapted to be connected to at least one signalling device which is located in said station for indicating incoming calls, switching means having current conductive and non-conductive states, means for rendering said switching means conductive and non-conductive respectively in response to on-hook and off-hook telephone set conditions at said station, means responsive to the transmittal of a predetermined ringing signal along said signal transmission line for completing a circuit through said switching means when in its conductive state, for simultaneously applying a ringing voltage across said terminal pair and from one terminal of said pair to ground to provide current for activating said signaling device regardless of whether it is connected across said terminal pair or from said one terminal to ground.

27. The apparatus as described in claim 17 wherein said ringing control circuit is connected to coils of a relay, whose contacts are connected to first and second diodes and a capacitor, whereby upon activation of said ring control circuit by a first current, contacts of said relay closed and AC voltage from a grounded power source is converted to unipolar pulses by the first diode and the capacitor, blocked by the second diode from the carrier circuit and applied to the switchboard through energized coils of said relay both metallically across a loop formed between the subscriber carrier unit and the switchboard as well as from ground to a lead forming a portion of said loop.

28. The apparatus as described in claim 18 wherein said subscriber carrier unit contains a dial switching circuit for outward dialing that upon completion of a metallic loop between the switching means and the subscriber carrier, a second current flows through said switch concomitantly activating an oscillator in the transmitter portion of the subscriber carrier unit and flowing additively with said first current in at least a portion of said ring-trip circuit to de-energize said coils.

References Cited

UNITED STATES PATENTS

| | | | |
|---|---|---|---|
| 2,654,804 | 10/1953 | Edson | 179—2.5 |
| 2,744,958 | 5/1956 | Hosmer | 179—2.5 |
| 2,857,464 | 10/1958 | Singer | 179—2.5 X |
| 2,932,694 | 4/1960 | Hawks et al. | 179—2.5 X |
| 3,029,312 | 4/1962 | Kehm | 179—15 |

RALPH D. BLAKESLEE, Primary Examiner

U.S. Cl. X.R.

179—84